(12) United States Patent
Safrani et al.

(10) Patent No.: US 7,813,600 B1
(45) Date of Patent: Oct. 12, 2010

(54) MECHANICAL OPTICAL SWITCH

(75) Inventors: Avner Safrani, Beer Sheva (IL); Moshe Gottlieb, Omer (IL)

(73) Assignee: Teliswitch Solutions, Ltd., Ramat Gan (IL)

( * ) Notice: Subject to any disclaimer, the term of this patent is extended or adjusted under 35 U.S.C. 154(b) by 0 days.

(21) Appl. No.: 12/313,904

(22) Filed: Nov. 25, 2008

Related U.S. Application Data

(60) Provisional application No. 60/989,936, filed on Nov. 25, 2007.

(51) Int. Cl.
*G02B 6/00* (2006.01)
*G02B 6/36* (2006.01)

(52) U.S. Cl. .......................... 385/16; 385/147
(58) Field of Classification Search ............. 385/15, 385/16, 22, 25–27, 141, 147
See application file for complete search history.

(56) References Cited

U.S. PATENT DOCUMENTS

| | | | | |
|---|---|---|---|---|
| 4,239,330 A | * | 12/1980 | Ashkin et al. | 385/22 |
| 5,590,227 A | * | 12/1996 | Osaka et al. | 385/53 |
| 5,600,739 A | * | 2/1997 | Anderson et al. | 385/16 |
| 5,613,021 A | * | 3/1997 | Saito et al. | 385/17 |
| 6,738,538 B2 | * | 5/2004 | Antaki et al. | 385/14 |
| 6,785,437 B2 | * | 8/2004 | Hagood et al. | 385/16 |
| 7,444,043 B2 | * | 10/2008 | Fan et al. | 385/16 |
| 2003/0169960 A1 | * | 9/2003 | Zhou | 385/16 |

* cited by examiner

*Primary Examiner*—Akm E Ullah
(74) *Attorney, Agent, or Firm*—Robert G. Lev

(57) ABSTRACT

A mechanical fiber optic switch, which includes a base structure and a plurality of first optical fibers, mounted on the base structure. The first optical fibers are arranged such that their ends define a curved cylinder surface. The switch also includes a plurality of second optical fibers adapted to be optically coupled to selected ones of the first fibers. A movable control unit is adapted to move within the switch and to move both the first and the second optical fibers.

22 Claims, 7 Drawing Sheets

MECHANICAL OPTICAL SWITCH

PRIORITY INFORMATION

The present invention claims priority to U.S. Provisional Patent Application No. 60/989,936 filed Nov. 25, 2007, making reference thereto and incorporating it in its entirety.

FIELD OF THE INVENTION

The present invention relates to communication systems and in particular to optical communication systems.

BACKGROUND OF THE INVENTION

Optical fibers, carrying light signals, are currently one of the basic communication media. In order to allow flexibility in communications, efficient switches, which allow coupling different optical fibers to each other at different times, are required. Optical fiber switches are required to be durable, robust, easily repaired and require low maintenance costs.

U.S. Pat. No. 4,834,488 to Lee, titled: "Fiberoptic Switch", the disclosure of which is incorporated herein by reference in its entirety, describes a switch in which a first fiber is rotated to be aligned with any of a plurality of fibers. This switch arrangement is not suitable for an M×N switch, in which any of M inputs can be connected to any of N outputs.

In M×N optical fiber switches it is generally required that any pair of input and output fibers can be connected or disconnected at any time, regardless of the connection state of the other fibers of the switch.

U.S. Pat. Nos. 4,955,686 to Buhrer et al., titled: "Optical Fiber Crossconnect Switch" and U.S. Pat. No. 5,050,955 to Sjolinder, titled: "Fiberoptic Switch", the disclosures of both of which are incorporated herein by reference in their entirety, describe rectangular optical switches that provide a solution for a M×N switch in which any of M inputs can be connected to any of N outputs.

U.S. Pat. No. 5,337,378 to Saito et al., titled: "Optical Fiber Switch Including Partitions for Restricting Surplus Fibers", the disclosure of which is incorporated herein by reference in its entirety, describes a switch formed of two rectangular arrays. A first array includes N first fibers in predetermined vertical positions adapted to slide horizontally. A second array includes N second fibers in predetermined horizontal positions configured to move vertically. In order to achieve a connection between a pair of fibers, the desired first fiber is moved to the horizontal position of the second fiber and the second fiber is moved to the vertical position of the first fiber. Each of the arrays has a fiber movement system, which moves the desired fiber into its place.

The above discussed rectangular switches are relatively large and generally require special arrangements for storing excess fiber lengths.

U.S. Pat. No. 6,859,575 to Arol et al., titled: "Self Aligning Opto-Mechanical Crossbar Switch", the disclosure of which is incorporated herein by reference in its entirety, describes an optical fiber switch having separate fiber movement units for each fiber. In one embodiment, this patent describes a cylindrical structure. A first set of fibers are arranged to slide around respective annular rings and a second set of fibers are arranged to slide linearly along bars on the periphery of a cylinder. Each fiber is associated with a motor which is used to move the fiber into place so that it is aligned with a corresponding fiber, thus providing a light path between a selected fiber from the first set and a selected fiber from the second set.

The cost of this switch is relatively high, as many controllers and motors are required. In addition, maintenance and trouble shooting are costly due to the large number of motors.

SUMMARY OF THE INVENTION

An aspect of some embodiments of the present invention relates to an optical fiber switch for controllably connecting fibers of a first group with fibers of a second group. A control unit movable within the switch is adapted to move both the first fibers and the second fibers in order to achieve a connection. Having a single unit control the movements of both the first and second fibers makes the control unit simpler, more robust and more durable than systems which require separate controllers for the first fibers and the second fibers.

In some embodiments of the invention, the movable control unit comprises a gripper adapted to grip fibers of the second group and move them with the movement of the movable control unit. Optionally, the movable control unit includes an arm adapted to move fibers of the first group into a position required for connecting to a specific fiber of the second group. In some embodiments, the arm of the movable control unit can move at most only a single first group fiber at any specific location of the movable control unit.

Optionally, the movable control unit is adapted to move the first fibers only in a first single dimension and to move the second fibers only in a second single dimension, such that a connection between each pair of first and second fibers can be achieved at a specific location on a two dimensional plane.

In some embodiments of the invention, the connection points between the first and second fibers are located on a cylindrical surface. Optionally, the movable control unit is configured to move the first fibers around a perimeter of a slice of the cylindrical surface, and to move the second fibers along a straight line parallel to an axis of the cylindrical surface. In some embodiments of the invention, the first group fibers are mounted on respective rotatable disks. The arm of the movable control unit is optionally adapted to rotate the disk of a first group fiber to align it with a specific second group fiber.

An aspect of some embodiments of the present invention relates to an optical fiber switch, including a plurality of first optical fibers having connectors on a cylindrical surface. The switch is adapted to connect second group fibers to the plurality of first fiber connectors using a single movable control unit.

Optionally, the single movable control unit includes up to eight motors, preferably no more than six motors, thus making the switch simple. In some embodiments of the invention, the movement of the moveable control unit requires up to three motors, optionally only two motors. The moveable control unit optionally includes an arm for moving the first optical fibers, controlled by at most two motors, optionally by only a single motor. The movable control unit optionally includes a gripper for grasping second group fibers, which is operated by at most four motors, optionally three motors.

The motors of the movable control unit may all move with it, or one or more of the motors may remain stationary while the movable control unit moves.

In some embodiments of the invention, the movable control unit comprises a fixed portion which is aligned with the cylindrical surface and a replaceable portion which carries the motors. The fixed portion and the replaceable portion are coupled together in a manner which allowing fast disconnection, for example by no more than twenty screws, possibly less than ten screws.

The use of a cylindrical arrangement allows using less accurate motors, than that required for linear movement. The cylindrical arrangement also allows for a larger fiber capacity per unit volume than linear arrangements, as for a cylinder with a width 2r and height h, the entire curved surface of the cylinder, having an area of 2πrh can be used for switching, while in a rectangular arrangement, only the area of 2rh can be used for switching. Thus, for a same volume, a cylindrical switch achieves two to three times more connections.

There is therefore provided in accordance with an exemplary embodiment of the invention, a mechanical fiber optic switch, comprising a plurality of first optical fibers, arranged such that their ends define a curved cylinder surface, a plurality of second optical fibers adapted to be optically coupled to selected ones of the first fibers, and a movable control unit adapted to move together within the switch and to move both the first and the second optical fibers.

Optionally, the second fibers include at their ends optical connectors and the plurality of first optical fibers include at their ends fiber adapters adapted to receive the optical connectors of the second fibers. Optionally, the ends of the second fibers and/or of the first fibers are configured to move only within a single dimension. Optionally, the ends of the first fibers are configured to move only along a circle. Optionally, the ends of the first fibers are mounted on respective rotatable disks. Optionally, the ends of the second fibers are configured to move only along a straight line. Optionally, the movable control unit comprises a linearly movable unit adapted to move along a straight line parallel to the straight lines of the second fibers.

Optionally, the movable control unit comprises a robotic unit mounted on the linearly movable unit, and adapted to move around the linearly moveable unit so as to access any of the second fibers. Optionally, the movable control unit comprises an arm adapted to move the ends of the first fibers. Optionally, the arm adapted to move the ends of the first fibers can move at any location of the movable control unit at most the end of one first fiber. Optionally, the switch includes no more than eight motors for moving the ends of the first and second fibers. Optionally, the movable control unit comprises a gripper adapted to grasp second fibers such that the fibers move with the movement of the moveable control unit.

Optionally, the moveable control unit is removable from the switch without misaligning any already aligned pairs of first and second fibers. Optionally, the number of motors in the switch is independent of the number of first fibers of the switch.

In some embodiments, the switch includes an anchoring unit with places for anchoring each of the second fibers. Optionally, the switch includes a light source which generates a light signal of specific characteristics whose light is directed into fibers in the rest dock and to any desirable fiber of the first fibers. In some embodiments, the switch includes a rotateable anchoring disk adapted for anchoring one or more second fibers.

Optionally, movement of the first fibers requires operating up to two motors of the switch. Optionally, the discs have a substantially circular or polygonal perimeter. Optionally, the movement mechanism comprises a circular ring on which the fiber gripper is mounted.

There is further provided in accordance with an exemplary embodiment of the invention, a method of switching fibers within an optical fiber switch, comprising determining a first fiber and a second fiber which are to be coupled, moving a control unit to a location of the second fiber, grasping the second fiber, moving the control unit while grasping the second fiber to a location at which it is to be coupled with the determined first fiber, moving the first fiber to a location at which it is to be coupled with the second fiber, by the control unit and coupling the first and second fibers.

Optionally, moving the first fiber comprises rotating a disk on which the first fiber is mounted. Optionally, the method includes moving a fiber coupled to the first fiber to an anchoring unit before moving the control unit to the location of the second fiber. Optionally, moving the control unit to the location of the second fiber comprises using at most two motors.

There is further provided in accordance with an exemplary embodiment of the invention, a mechanical fiber optic switch, comprising a plurality of first optical fibers, having optical interface ends distributed along a longitudinal axis, a plurality of second fibers movable relative to the longitudinal axis, such that each of the second fibers can be optically coupled with the first fibers; a fiber gripper adapted to move fibers; and a movement mechanism adapted to move the fiber gripper along the longitudinal axis and to achieve' relative rotation of the fiber gripper around the longitudinal axis.

Optionally, the switch includes a controller adapted to receive an instruction to align a first fiber and a second fiber and to control the movement mechanism and the fiber gripper so as to align the first fiber and the second fiber. Optionally, the controller is controllable over a communication network from a remote location. Optionally, the switch includes a plurality of mounts which hold the first optical fibers at fixed positions along the length of the longitudinal axis. Optionally, the plurality of mounts comprises thin discs substantially perpendicular to the longitudinal axis. Optionally, the discs have a substantially circular or polygonal perimeter. Optionally, the plurality of mounts hold the first optical fibers in a manner which allows them to rotate around the longitudinal axis.

Optionally, the plurality of mounts hold the first optical fibers in a manner which allows each first fiber to rotate on its own around the longitudinal axis, without others of the first fibers. Optionally, the plurality of mounts hold the first optical fibers with their optical interface ends directed substantially radially from the longitudinal axis.

Optionally, the movement mechanism comprises a circular ring on which the fiber gripper is mounted. Optionally, the circular ring is mounted such that the longitudinal axis is located in its center. Optionally, the circular ring is rotatable. Optionally, the gripper is adapted to move along the ring. Optionally, the circular ring is adapted to move linearly parallel to the longitudinal axis. Optionally, the switch includes a shaft coinciding with the longitudinal axis and wherein the plurality of first optical fibers extend through the shaft.

Optionally, the movement mechanism comprises a motor adapted to rotate the shaft. Optionally, the switch includes at least 1 first optical fibers per 8 millimeter length of the longitudinal axis. Optionally, the second fibers are adapted to be aligned with the first fibers in a manner which allows passage of light signals between pairs of first and second fibers even when the switch is disconnected from any power source of the switch. Optionally, the second fibers are adapted to be aligned with the first fibers in a manner which allows passage of substantially all light wavelengths in one of the first and second fibers to the other of the first and second fibers.

Optionally, movement mechanism is removable without misaligning any already aligned pairs of first and second fibers. Optionally, the switch movement mechanism includes fewer than ten motors. Optionally, the ratio between the number of first fibers and the number of motors in the movement mechanism is greater than 20. Optionally, the switch includes a rest dock for connecting second fibers not currently aligned to a first fiber. Optionally, the switch includes a light source which generates a light signal of specific characteristics whose light is directed into fibers in the rest dock and to any desirable fiber of the first fibers.

There is further provided in accordance with an exemplary embodiment of the invention, a mechanical optical switch, comprising a first mount for holding a plurality of first optical fibers; a second mount for holding a plurality of second optical fibers; and a movement mechanism adapted to move at least one of the first and second optical fibers so as to align pairs of first and second fibers, such that light signals pass between aligned first and second fibers, wherein the movement mechanism is substantially entirely removable, without misaligning any of the aligned pairs of first and second fibers. Optionally, the switch includes the movement mechanism is removable without requiring removable of more than 8 screws.

There is further provided in accordance with an exemplary embodiment of the invention, a mechanical fiber optic switch, comprising a base structure; a plurality of first optical fibers mounted on the base structure, having optical interface ends defining together a surface of a cylinder; and a fiber manipulation mechanism adapted to move a plurality of second fibers and align one or more of the second fibers with respective ones of the first fibers.

Optionally, the fiber manipulation mechanism comprises fewer than a single motor for each 10 first optical fibers. Optionally, the first optical fibers define the cylinder surface from outside or from inside.

BRIEF DESCRIPTION OF FIGURES

Exemplary non-limiting embodiments of the invention will be described with reference to the following description in conjunction with the figures. Identical structures, elements or parts which appear in more than one figure are preferably labeled with a same or similar number in all the figures in which they appear, in which.

DETAILED DESCRIPTION OF EMBODIMENTS

Switch Overview

Figure 1:
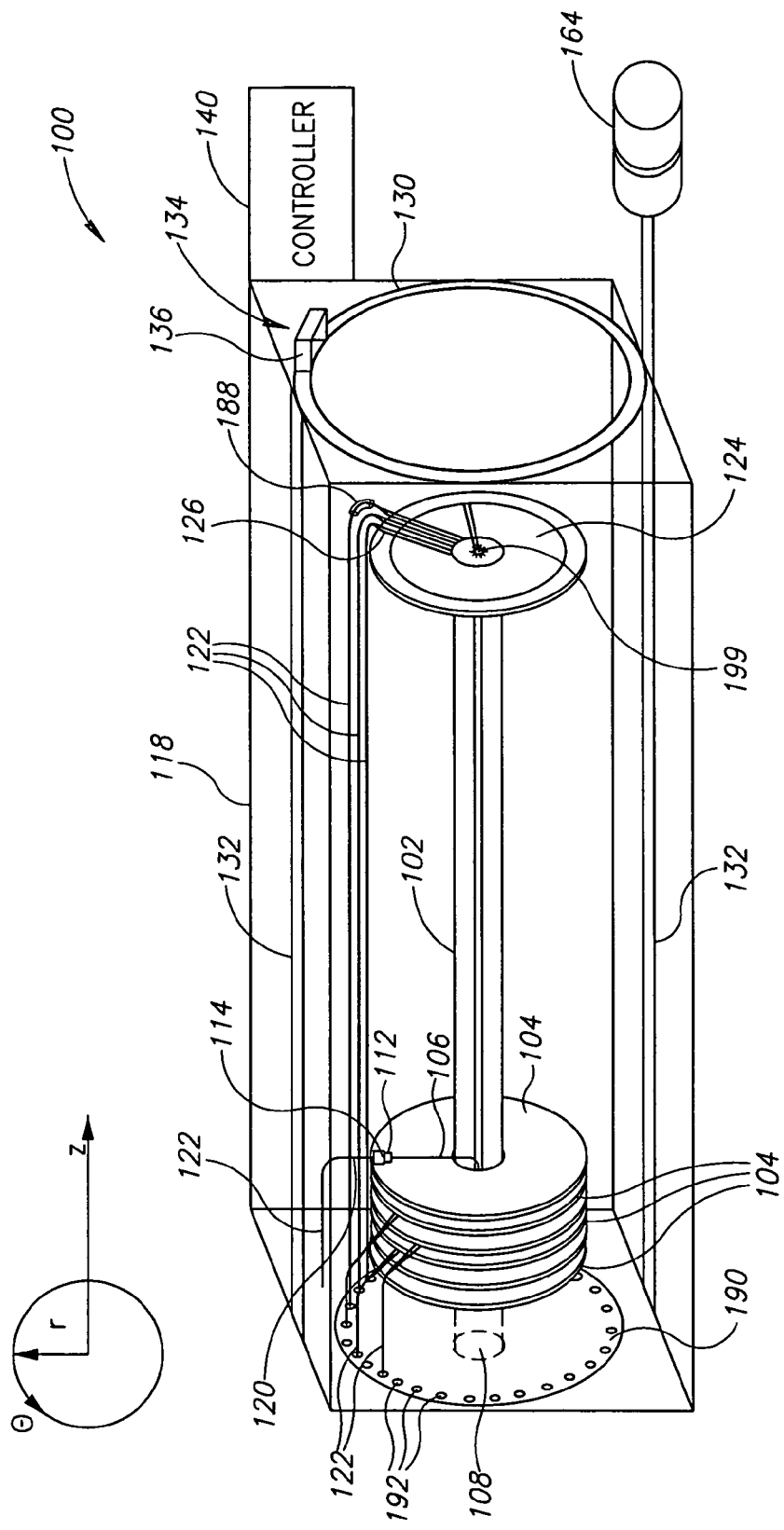
FIG. 1 is a schematic illustration of a mechanical cylindrical optical fiber switch, in accordance with an exemplary embodiment of the invention.

FIG. 1 is a schematic illustration of a mechanical optical fiber switch 100, in accordance with an exemplary embodiment of the invention. Switch 100 includes a central shaft 102 which leads a plurality of input optical fibers 106, only one of which is shown, from an entrance 108 to a plurality of respective rotary disks 104, located at fixed positions along shaft 102, but rotatable around the shaft 102. A plurality of output optical fibers 122 are arranged around the perimeter of disks 104 free to move along an axis (referred to herein as the Z-axis) parallel to shaft 102, but confined to predetermined positions around the perimeters of rotatable disks 104, in order to avoid tangling of the fibers. The lines along which the output optical fibers 122 move define together the curved surface of a cylinder.

Optionally, each input optical fiber 106 has an optical connector 112 at its end, as are generally provided at the ends of optical fibers. An optical fiber adapter 114, suitable for optically coupling two optical fibers, is connected to optical connector 112, in a manner adapted to couple to respective output fiber connectors 120 of output optical fibers 122. Optical fiber adapters 114 optionally have their ends directed radially outward. Optical fiber adapters 114 are optionally standard adapters of the type used for coupling two optical fibers by receiving their connectors 112 and 120. For simplicity, optical connectors 112 and 120 and optical adapters 114 are optionally standard units widely used in optical fiber systems. Alternatively, a proprietary fiber connector more suitable for handling by switch 100 may be used for fiber connector 120 and/or fiber 112. In an exemplary embodiment, instead of using both a connector 112 and adapter 114, each input fiber 106 has at its end a single connector receiver adapted to receive connectors 120. Switch 100 optionally additionally includes an anchoring disk 124 including a plurality of anchoring sockets 126, where output fiber connectors 120 are placed when their output fibers 122 are not in use.

In the following description, the position around the periphery of disks 104 is designated by a coordinate $f$. For a switch 100 including N output fibers 122, each output fiber 122 (n∈N) is located at a specific position $\theta_n$. In order to couple a specific output fiber 122 to an input fiber 106 (designated m), the disk 104 of the input fiber 106 is rotated such that the $\theta_m$ position of the input fiber 106 is the same as the position $\theta_n$ of the specific output fiber 122.

Switch 100 further comprises a moveable control unit 134, which is adapted to move output fibers 122 between disks 104 and also to rotate disks 104 in order to connect specific input and output fibers, as desired. Moveable control unit 134 optionally comprises a ring 130 adapted to travel along the Z-axis, surrounding disks 104, on one or more rails 132 and a robotic unit 136 adapted to move around ring 130, to rotate disks 104 and to grasp optical fibers 112, to couple and uncouple output optical fibers 122.

A controller 140 optionally receives switching instructions, and controls the movements of ring 130 and robotic unit 136 accordingly. In some embodiments of the invention, controller 140 includes a network interface and is adapted to receive instructions over a communication network, optionally a wireless network, from a remote location.

The elements of switch 100 are optionally included entirely in a casing 118, of a standard size, for example a size which fits into a 19-inch rack, as defined by the International Standard IEC 60297 standard, published June 2007. Optionally, disks 104 have a diameter small enough to allow the disks 104 with the surrounding control unit 134 to fit into the area of the 19 inch rack, and the height of the casing 118, along the Z-axis, fits into the height of standard 19-inch racks, e.g., 2 meters or 2.6 meters. Alternatively to fitting into a 19-inch rack, casing 118 may be suitable to fit into other rack sizes, such as a 21-inch rack or a 23-inch rack. Optionally, casing 118 has a volume of less than 0.2 cubic meters, possibly less than 0.12 cubic meters. In some embodiments of the invention, casing 118 is small enough to fit into a standard street communication well and/or street cabinet.

Figure 2:
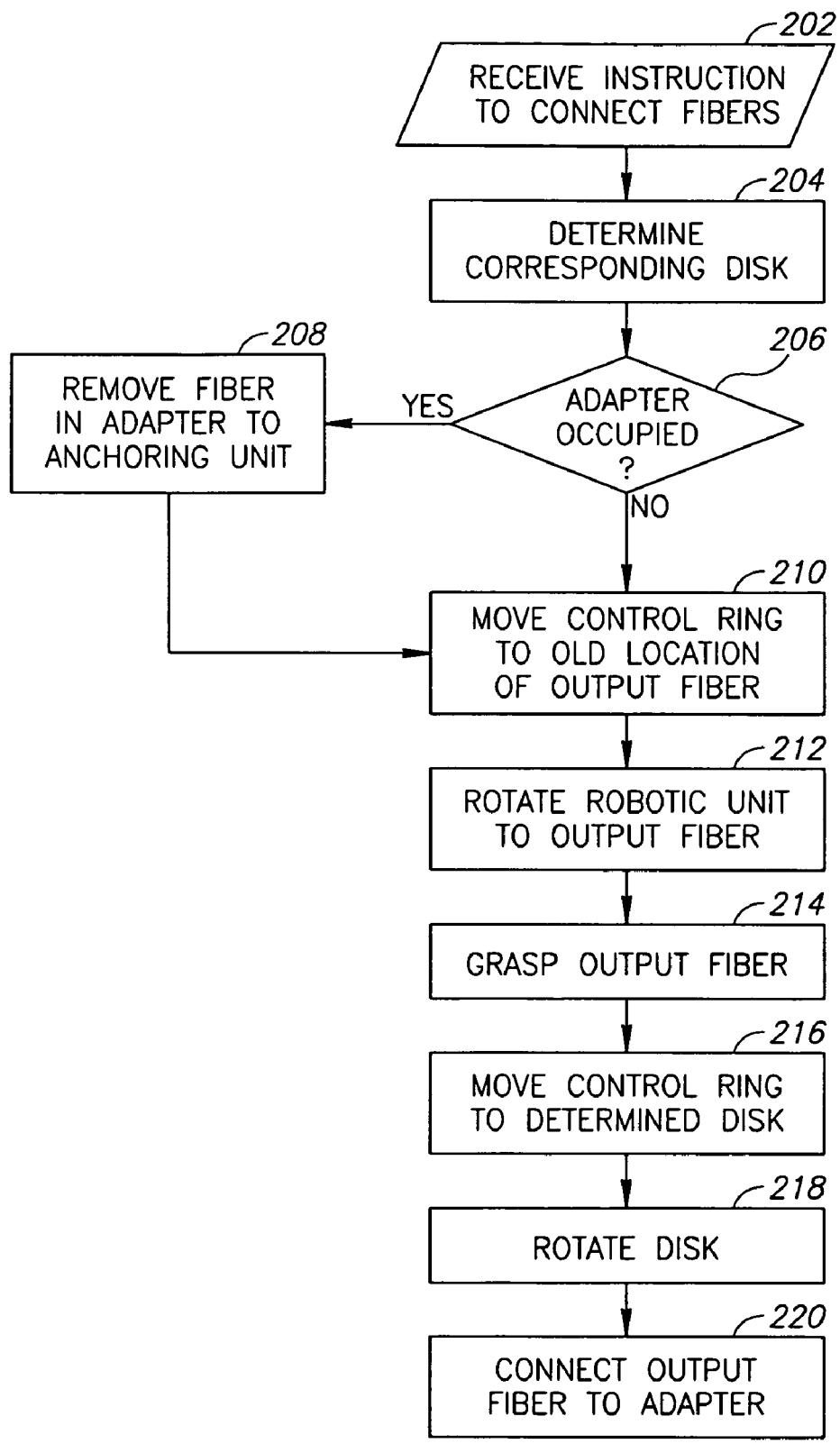
FIG. 2 is a flowchart of acts of a switching process, in accordance with an exemplary embodiment of the invention.

FIG. 2 is a flowchart of acts of a switching process, in accordance with an exemplary embodiment of the invention. Upon receiving (202) an instruction to couple a specific input fiber 106 to a specific output fiber 122, controller 140 determines (204) which disk 104 corresponds to the specific input fiber 106 and checks (206) whether the adapter 114 on the determined disk 104 is empty. If (206) the adapter 114 is occupied, the output fiber 122 therein is removed (208) therefrom and placed in an anchoring socket 126, using the method detailed hereinbelow for moving fibers.

Once it is determined that the adapted 114 is not occupied, the specific output fiber is moved into the empty adapter, as is now detailed. In order to couple a specific output fiber 122 to a specific input fiber 106, ring 130 is moved (210) to the Z-position of the old location of the specific output fiber 122. Robotic unit 136 is rotated (212) around ring 130 to the location of the specific output fiber 122 and the robotic unit 136 grasps (214) the specific output fiber 122. Ring 130 is then moved (216) along the Z-axis to the determined disk 104 of the specific input fiber 106 and robotic unit 136 rotates (218) the disk 104 so that its adapter 114 is in the direction of the specific output fiber 122 and then connects (220) the output fiber 122 to the adapter 114.

Optionally, controller 140 manages a directory listing the connectivity of the input and output fibers, and accordingly the locations of the fibers are determined. It is noted that once a pair of input and output fibers are connected they do not depend on control unit 134 and the control unit may be removed, for example for repair, while switch 100 continues to operate uninterrupted.

Figure 3:
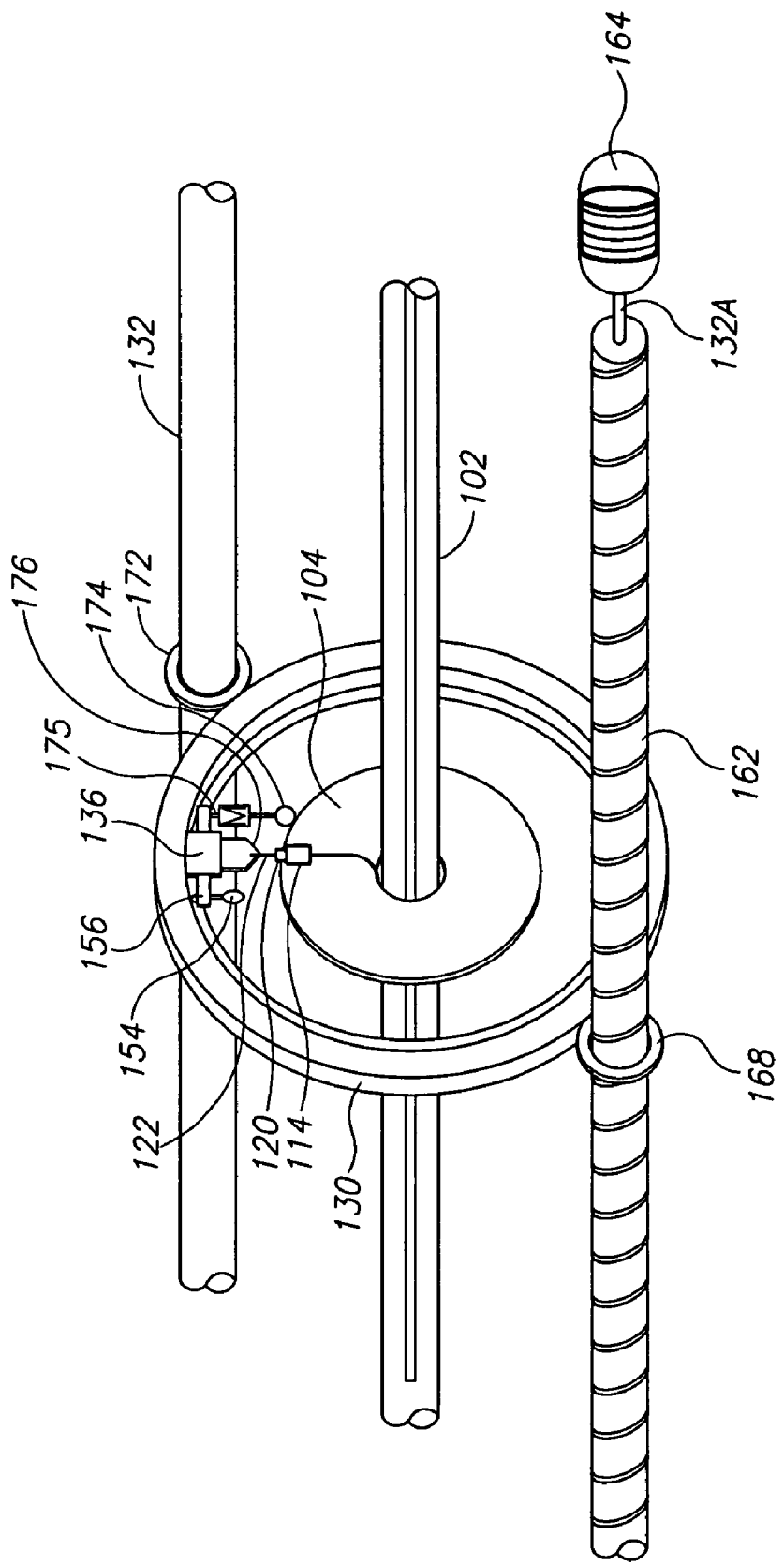
FIG. 3 is an exploded schematic illustration of a fiber switching unit of an optical fiber switch, in accordance with an exemplary embodiment of the invention.

FIG. 3 is a schematic detailed illustration of ring 130 and robotic unit 136, in accordance with an exemplary embodiment of the invention. One of rails 132 (referred to as rail 132A) optionally has a screw shaped external surface 162, which is controllably rotatable by a motor 164. A rider 168, which is essentially a nut thereupon, coupled to ring 130 is adapted to move in the Z-direction upon rotation of rail 132A, thereby moving ring 130 therewith. Optionally, ring 130 has a respective smooth guiding ring 172 on each additional rail 132, which assures smooth movement of ring 130 along the rail 132.

Robotic unit 136 is optionally controllably moveable along the inner periphery of ring 130, so that it can access any output fiber 122 at its position $\theta_n$. A miniature motor 154 coupled to a gear 156 optionally controls the movement of robotic unit 136 along the inner perimeter of ring 130. A gripper 176 is adapted to grasp output fibers 122 and couple and uncouple the fibers to adapters 114. Robotic unit 136 optionally includes a wheel 174, rotated by a motor 175, which is used to rotate disks 104 to a desired θ position. Alternatively to wheel 174, other mechanical systems for rotating disks 104 may be used, such as a gear and respective grooves on disks 104.

Optional Structural Details

In some embodiments of the invention, shaft 102 is hollow and input optical fibers 106 extend from entrance 108 to their respective rotary disk 104 within the shaft 102. Optionally, shaft 102 is perforated with exit holes allowing input optical fibers 106 to exit the shaft at their respective disks 104. Alternatively, shaft 102 comprises one or more slits for input optical fibers 106 to pass through. Further alternatively or additionally, some or all of input optical fibers 106 extend around the external periphery of shaft 102. Shaft 102 may have any suitable cross-section, such as circular or rectangular. In some embodiments of the invention, shaft 102 has a screw threaded external surface, including grooves for directing fibers 106 gradually from their extension along shaft 102 to their end connection, radial to shaft 102.

In some embodiments of the invention, disks 104 are mounted on plastic bearings mounted on shaft 102. Disks 104 optionally have a substantially circular perimeter, such that they require minimal clearance. Alternatively, for ease of production, one or more of disks 104 has a regular polygonal perimeter, optionally, having at least six or even at least eight edges. Further alternatively, disks 104 may have other shapes. Rotary disks 104 optionally have a radius selected to accommodate a desired number of output fibers around their perimeter, according to the size of the adapters 114. Alternatively or additionally, the size of disks 104 is selected such that switch 100 fits into a casing 118 of a desired size.

In some embodiments of the invention, disks 104 are thin, having a thickness of less than 2 millimeters or even less than one millimeter, although thicker disks may also be used. In an exemplary embodiment of the invention, disks 104 have the thickness of their input fiber adapter 114, and the input fiber 106 is embedded within the disk 104. Optionally, switch 100 includes at least one disk 104 every centimeter along shaft 102 or even at least a disk 104 every eight or even every seven millimeters.

In some embodiments of the invention, switch 100 includes a confinement disk 190, including a plurality of holes 192, through which output fibers 122 extend in a manner which prevents them from becoming tangled with each other. Disk 190 is optionally larger than rotary disks 104, with holes 192 being located on a circle larger than rotary disks 104, such that fibers 122 do not touch any of the disks 104.

Output fibers 122 are optionally covered near their ends by a protective sleeve 188, which holds their end portion in a bent position, allowing connection of the connectors 120 to adapters 114. Protective sleeves 188 also define a distance between fibers 122, preventing the fibers 122 from touching any of disks 104.

Anchoring Disk

Anchoring disk 124 is optionally stationary, for example fixed to shaft 102. In some embodiments of the invention, anchoring disk 124 is located at an end of shaft 102. Optionally, anchoring disk 124 is positioned at the end of shaft 102 opposite the entrance to switch 100 of output fibers 122, such that output fibers 122 not in use extend substantially over the entire length of shaft 102. Alternatively, anchoring disk 124 is positioned near the end of shaft 102 closest to the entrance where the output fibers 122 enter switch 100, such that unused fibers 102 do not pass over rotary disks 104. As shown in FIG. 1, output fibers 122 and input fibers 106 enter switch 100 from the same direction. In other embodiments, output fibers 122 enter switch 100 from the opposite side, or from any other direction. In some embodiments of the invention, anchoring disk 124 is located between rotary disks 104, optionally mid way between the ends of shaft 102, so that the distance that needs to be traversed by ring 130 in order to connect or disconnect a fiber is not more than half the length of shaft 102.

In some embodiments of the invention, anchoring disk 124 includes a connector for each of output fibers 124 in its respective angle θ. Alternatively, anchoring disk 124 includes fewer connectors than the number of output fibers 122, according to the expected usage of output fibers 122. Optionally, output fibers 122 which do not have corresponding anchors in anchoring disk 124 are kept in unused input fiber adapters 114. In some embodiments, output fibers 122 may be moved in the θ direction at the Z-position of anchoring device 124, to a limited extent (e.g., up to 5° or up to 15°).

Alternatively to a single anchoring disk 124, switch 100 may include two or more anchoring disks. In some embodiments of the invention, in accordance with this alternative, each of the anchoring disks can be used for any output fiber 122. Controller 140 optionally selects the closest anchoring disk 124 to anchor a specific output fiber 122, in order to minimize the disconnect time of the output fiber. Alternatively or additionally, controller 140 takes into account an estimate of an expected rotary disk 104 to which the fiber will be next connected in selecting the anchoring disk to be used. For example, controller 140 may manage for each output fiber 122 statistics concerning the input fibers 106 to which it was previously connected and accordingly select the anchoring disk 124 to be used.

In other embodiments of the invention, each of the anchoring disks 124 has connectors for a portion of the output fibers 122 and each output fiber 122 has a single position at which it is to be anchored. It is noted that an intermediate embodiment may be used, for example having three anchoring disks 124, each having connectors for two-thirds of the output fibers 122, such that each output fiber has two possible anchoring locations.

Instead of being stationary, anchoring disk 124 is rotatable around shaft 102 and includes only a single connector. Output fibers 122 not in use are held in adapters 114 of input fibers 106 not in use. In order to couple an output fiber 122 to a specific adapter 114, the output fiber 122 currently in the specific adapter 114 is moved by the control unit 134 to the anchoring disk 124 and then the output fiber 122 is placed in the specific adapter 114. It will be appreciated that while the switching in such embodiments may take more time, the anchoring is simpler and the anchoring of the output fibers in the adapters 114 prevents dust from entering the input fibers 106.

In some embodiments of the invention, anchoring disk 124 comprises a light source 199 which generates a light signal of specific characteristics whose light is directed into fibers in anchoring disk 124. Optionally, the light signal is unique to each switch 100. The light may be used by remote units to identify to which other switches they are connected.

Alternative Embodiments

Figure 4A:
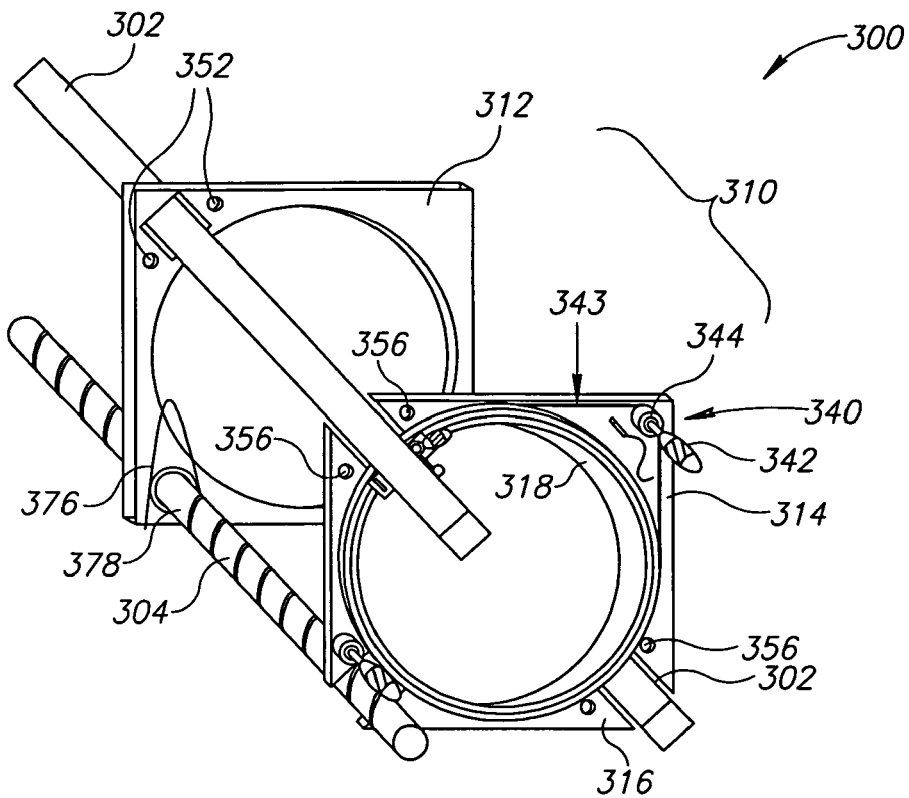
FIG. 4A is a schematic illustration of elements of an automatic fiber switching unit, in a separated state, in accordance with another exemplary embodiment of the invention.
Figure 4B:
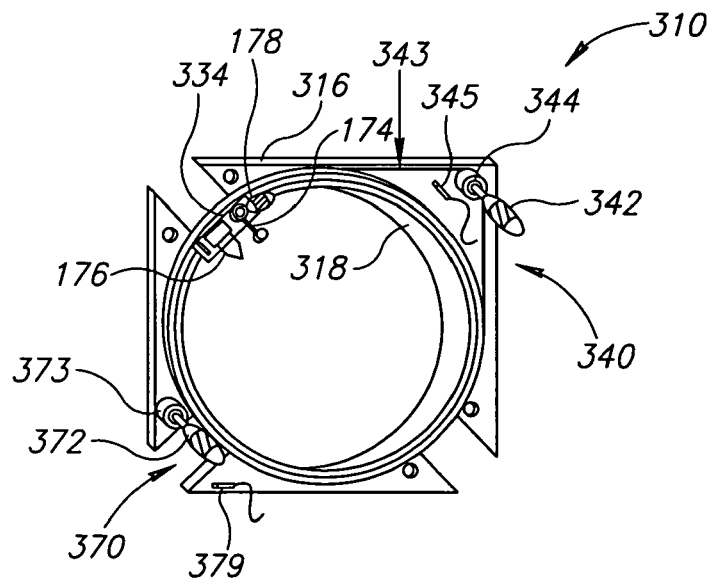
FIG. 4B is a schematic illustration of the automatic fiber switching unit of FIG. 3A, in its employed state, in accordance with another exemplary embodiment of the invention.

FIGS. 4A-4B are schematic illustrations of an automatic fiber switching unit 300, in accordance with another exemplary embodiment of the invention. Fiber switching unit 300 may be used instead of movable control unit 134 and rails 132 of switch 100 shown in FIG. 1. Fiber switching unit 300 comprises a switching board 310, which is designed to move along a pair of rails 302 driven by rotation of a threaded shaft 304. Switching board 310 includes an inner rotating ring 318, which is controllably rotatable relative to an outer base 316, by a rotation unit 340. A robotic unit 334 mounted on inner rotating ring 318, includes a wheel 174, which is used to rotate rotary disks 104, and a gripper 176, which grasps fibers 122. A motor 178 controllably rotates wheel 174. Switching board 310 further includes a translation unit 370, which controls the movement of the board 310 along rails 302.

Switching board 310 is optionally formed of two separate plates 312 and 314, shown separately in FIG. 4A and connected together into board 310 in FIG. 4B, for example using screws 352 which fit into respective holes 356. In some embodiments of the invention, motors and other delicate components which are liable to failure are placed on plate 314, while plate 312 is aligned with rails 302 and 304, to allow for smooth movement along the Z-axis. Thus, in case of equipment failure, plate 314 is removed from plate 312 and fixed or replaced by a different plate 314 which is easily screwed back to plate 312. As plate 312 is not moved during the replacement, there is no need to realign plate 312 or plate 314 with rails 302.

Rotation unit 340 optionally includes a motor 342, configured to rotate a wheel 344, which rotates inner rotating ring 318, via a mechanical belt 343. An optical reader 345 optionally provides feedback on the angle θ of robotic arm 334. In some embodiments of the invention, markings are located on the inner side of mechanical belt 343 and optical reader 345 reads these markings and accordingly provides controller 140 with feedback regarding the θ position of robotic arm 334. In some embodiments of the invention, the markings include perforations in belt 343 and optical reader 345 counts the perforations during movement. Alternatively or additionally, other suitable feedback units may be used, such as an optical, magnetic, mechanical or other encoder located on or near the axis of the motor, which counts the rotation cycles of the motor. It is noted that instead of mechanical belt 343, a gear chain or other transmission device may be used.

Translation unit 370 optionally includes a motor 372 mounted on board 314, which controllably rotates a wheel 373 (shown only on one face of plate 314 but extending to the other face), which in turn rotates with respect to threaded shaft 304, being driven via a mechanical belt 376. Optionally, shaft 304 has an enlarged portion 378, to which mechanical belt 376 connects. It is noted, however, that other transmission devices may be used, such as gear trains. Translation unit 370 optionally includes an optical reader 379 which tracks the movement of switching board 310 along shaft 304, for example by counting threads or other markings on shaft 304.

Robotic unit 334 optionally includes an optical reader 336, or other feedback unit, which provides feedback on the angle of the input fiber 106 on the rotary disk 104 (see FIG. 1) currently handled by switching board 310. Optionally, disks 104 include suitable markings which are trackable by optical reader 336.

In some embodiments of the invention, robotic unit 334 includes a gripper motor (not shown in FIGS. 4A and 4B), which opens and closes the arms of gripper 176. Robotic unit 334 optionally further includes one or more motors, which control radial movement toward and away from disks 104, in order to grasp or release fibers 122. In one embodiment, two motors are used to control the radial movement of gripper 176. A first motor is used to moved the gripper 176 for a first extent, roughly, bringing the gripper close to the adapter 114, and a second motor is used to perform a fine movement of an additional extent bringing gripper 176 precisely to its required radial position.

Optionally, all the motors of switch 100 are located on switching board 310 and move therewith along the Z-axis. Alternatively, one or more motors are stationary and do not move along the Z-axis. In some embodiments of the invention, one or more of the motors move along the Z-axis, but do not rotate with robot unit 334. In an exemplary embodiment of the invention, the motor driving the movement along the Z-axis does not move with board 310, the motors driving the θ movements of robotic arm 334 and of disks 104 move with switching board 310 along the Z-axis, but do not move around disks 104, and the motors that control gripper 176 move both along the Z-axis and around disks 104.

Figure 5:
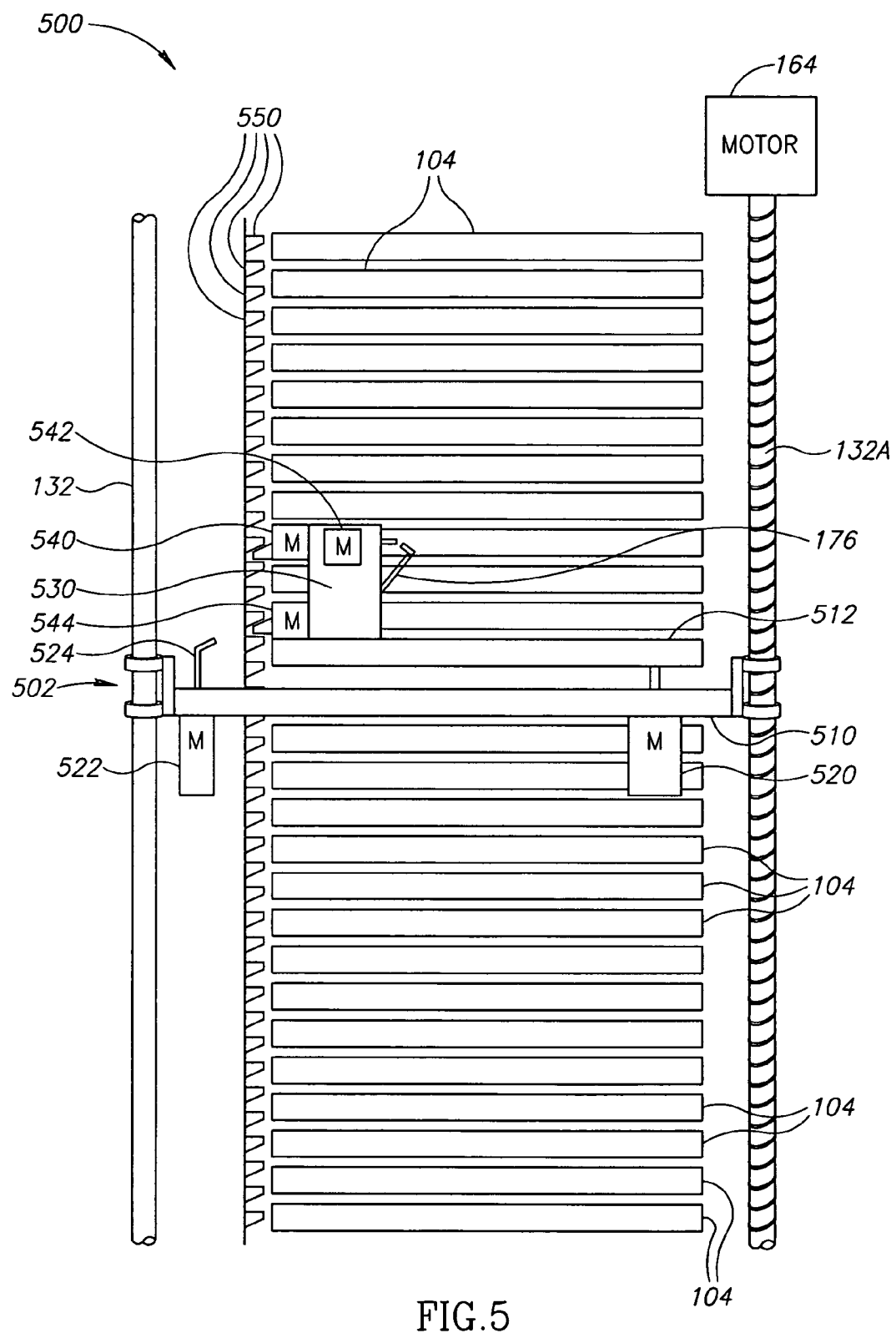
FIG. 5 is a schematic illustration of a mechanical optical fiber switch, in accordance with another exemplary embodiment of the invention.

FIG. 5 is a schematic illustration of a switch 500, in accordance with another exemplary embodiment of the invention. In switch 500, a moving control unit 502 comprises a first ring 510 which is moved linearly along rail 132A, by motor 164, and a second ring 512 which moves linearly with first ring 510 and additionally rotates around disks 104, driven by motor 520. Motor 520 is attached to first ring 510 and moves with ring 510. A motor 522, which controls the rotation of disks 104 by an arm 524 is also mounted on ring 510 and does not rotate around disks 104. A robotic unit 530 mounted on second ring 512 includes a motor 540, which controls the opening and closing of grippers 176, and two motors 542 and 544 which control the radial movement of grippers 176 toward disks 104.

In some embodiments of the invention, a plurality of stops 550 prevent undesired movements of disks 104. Optionally, when ring 512 is positioned on the level of a disk 104 it pushes the respective stop 550 of the disk 104 out of place, allowing movement of that particular disk 104. Alternatively, other methods may be used to disable the stop 550 and allow the disk 104 to be rotated.

Figure 6:
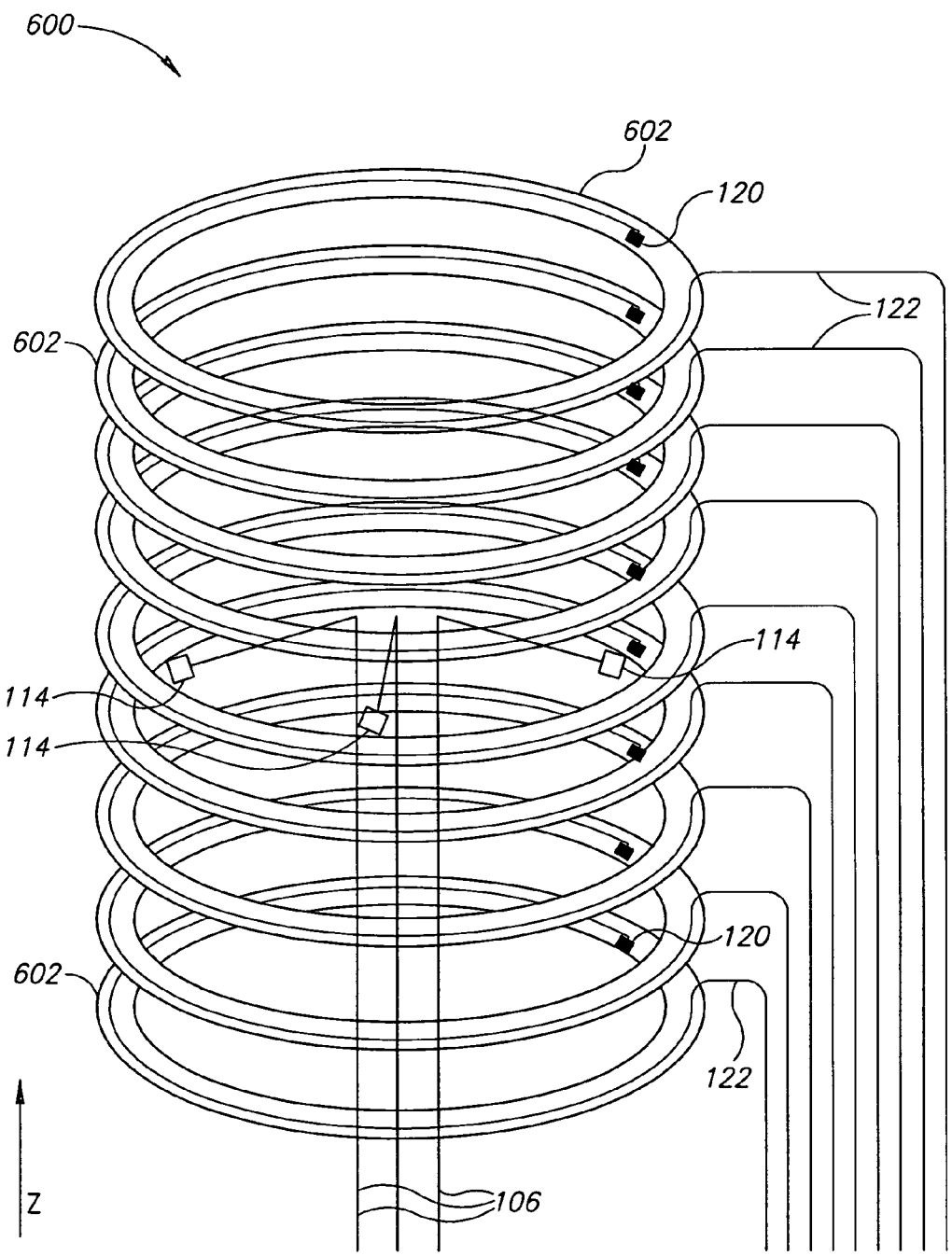
FIG. 6 is a schematic illustration of a core of a switch, in accordance with still another embodiment of the invention.

FIG. 6 is a schematic illustration of a core of a switch 600, in accordance with another embodiment of the invention. Switch 600 includes a plurality of annular rings 602 connected to output fibers 122 extending along the outside of the rings. Output fibers 122 do not move linearly along the Z-axis, but their connectors 120 are movable by rotating rings 602. Each of input fibers 106 can move linearly along the Z-axis and has an adapter 114 directed in a unique angle. A control unit (not shown) moves input fibers 106 linearly and connectors 120 radially, to couple together a desired input and output fiber pair.

Handling of Excess Fiber Length

Figure 7:
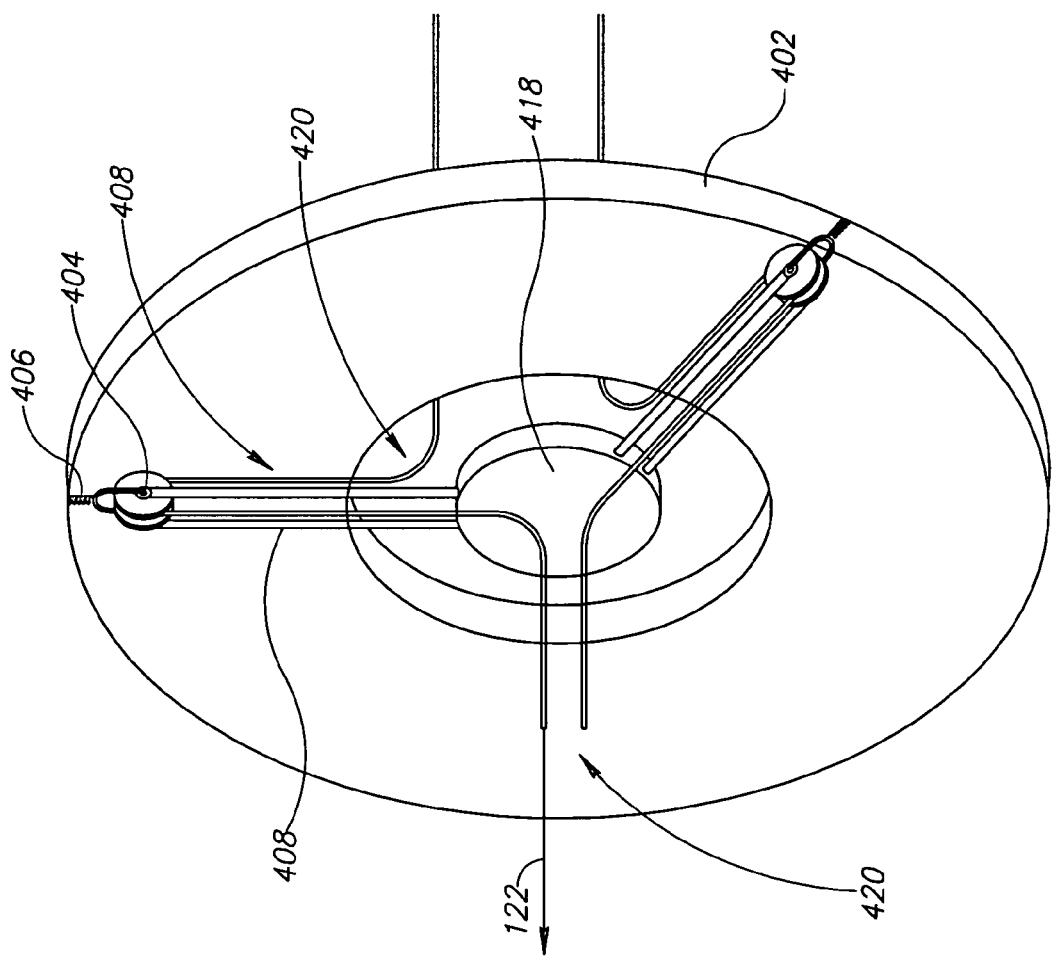
FIG. 7 is a schematic illustration of an excess-fiber handling device, in accordance with an exemplary embodiment of the invention.

FIG. 7 is a schematic illustration of an excess-fiber handling device 400, in accordance with an exemplary embodiment of the invention. Device 400 is Optionally Used to Hold Output fibers 122 taut, even when connected to a disk 104 close to the entrance end of fibers 122, so that the fibers do not have slack which may contact rotary disks 104 or other elements of switch 100. Excess-fiber handling device 400 optionally comprises an annular unit 402, which includes, for each output fiber 122 (for clarity, only two are shown in FIG. 7), a pulley 404, mounted moveably on rails 408, on which the fiber passes. Each pulley is connected to a respective spring 406 which applies a radial force on the pulley 404, so that excess fiber portions of the output fiber 122 are held between a central portion 418 of annular unit 402 and pulley 404. In some embodiments of the invention, at points where fiber 122 is bent, it is encased within a rigid plastic tube 420, or other suitable protection, to prevent breakage.

The tension of springs 406 is selected to be on the one hand, sufficient to pull the pulley radially when the fiber 122 is slack, while not preventing robot arm 134 from pulling the fiber along the Z-axis (FIG. 1).

It is noted that instead of mounting pulleys 404 of all output fibers 122 onto a single annular unit 402, pulleys 404 may be distributed over a plurality of annular units, or other shaped units, to allow for more room for each pulley 404 and its accompanying elements. Furthermore, pulleys 404 need not be arranged in an annular structure, but rather may be positioned in other suitable arrangements. It is further noted that in some embodiments, pulleys to prevent slack may be provided only for some of output fibers 122, for example those fibers having a higher chance of being connected to input fibers 106 closer to the output fiber entrance end of switch 100. Alternatively or additionally, some or all of output fibers 122 are kept taut using any other appropriate method of the art. In some embodiments, slack handling units as described in U.S. provisional application 61/030,965 to Avner Safrani, titled "Optical Fiber Roller", filed Feb. 24, 2008, the disclosure of which is incorporated herein by reference in its entirety, may be used for some or all of the fibers.

While in the above description a single fiber switching unit (e.g., 300) which controls the switching of all the input and output fibers is described, in other embodiments, for example in very large switches in which frequent switching is performed, two or more fiber switching boards 310 may be used. Optionally, each switching board controls the switchings in a predetermined segment along shaft 102. Optionally, when an output fiber 122 is to move between the segments of different switching boards 310, a first switching board brings the output fiber 122 to an anchoring unit between the segments and the second switching board 310 collects it therefrom and brings it to its destination.

It is noted that to if desired, two or more switches 100 may be cascaded to achieve switching between a larger number of fibers.

The above described switches may be used with connectors of various types. In some embodiments, dual fiber connectors are used and each input and output fiber is actually formed of a plurality of fibers, for a pair of fibers or a set of four fibers. In some embodiments, a switch is designed with more than fifty disks 104, or even more than one hundred and twenty disks 104, for example 144 disks. In an embodiment in which each disk handles two input fibers and two output fibers, which are coupled together with dual fiber connectors, one hundred and forty four disks 104 can be used to switch as many as 576 fibers.

Conclusion

It will be appreciated that the above described methods may be varied in many ways, including, changing the specific elements used and their layout. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

We claim:

1. A mechanical fiber optic switch, comprising:
a base structure;
a plurality of first optical fibers mounted on the base structure, arranged such that their ends are adapted to move along respective paths together defining a curved cylinder surface;
a plurality of second optical fibers adapted to be optically coupled to selected ones of the first fibers; and
a movable control unit adapted to move relative to the base structure and to selectively control movement of the ends of the first optical fibers along their respective paths and to selectively control movement of each of the second optical fibers without moving therewith at least one of the other second fibers.

2. The switch of claim 1, wherein the second fibers include at their ends optical connectors and the plurality of first optical fibers include at their ends fiber adapters adapted to receive the optical connectors of the second fibers.

3. The switch of claim 1, wherein the ends of the first fibers are configured to move only along respective circular paths.

4. The switch of claim 3, wherein the ends of the first fibers are mounted on respective rotatable disks, which each rotates separately from the other disks.

5. The switch of claim 3, wherein the ends of the second fibers are configured to move only along respective straight lines.

6. The switch of claim 5, wherein the movable control unit comprises a linearly movable unit adapted to move along a straight line parallel to the straight lines of the second fibers.

7. The switch of claim 6, wherein the linearly movable unit has a closed shape which surrounds the curved cylinder surface defined by the ends of the plurality of first optical fibers.

8. The switch of claim 1, wherein the movable control unit comprises an arm adapted to move the ends of the first fibers.

9. The switch of claim 1, wherein the switch includes no more than eight motors for moving the ends of the first and second fibers.

10. The switch of claim 1, wherein the movable control unit comprises a gripper adapted to selectively grasp second fibers such that the fibers move with the movement of the moveable control unit.

11. The switch of claim 1, wherein the moveable control unit is removable from the switch without misaligning any already aligned pairs of first and second fibers.

12. The switch of claim 1, wherein the number of motors in the switch is independent of the number of first fibers of the switch.

13. The switch of claim 1, comprising an anchoring unit with places for anchoring each of the second fibers with an optical coupling to a light source which generates a light signal of specific characteristics or to a light detector.

14. The switch of claim 1, wherein movement of the first fibers requires operating up to two motors of the switch.

15. The switch of claim 1, wherein the first fibers are mounted on respective disks having a substantially circular or regular polygonal perimeter.

16. The switch of claim 1, wherein the movable control unit comprises a circular ring on which a fiber gripper is mounted.

17. A method of switching fibers within an optical fiber switch, comprising:
determining a first fiber and a second fiber which are to be coupled, within a switch having a cylindrical structure;
moving a control unit to a location of the second fiber;
grasping the second fiber;
moving the control unit while grasping the second fiber to a location at which it is to be coupled with the determined first fiber;
moving the first fiber to a location at which it is to be coupled with the second fiber, by the control unit, by rotating a member on which the first fiber is mounted; and
coupling the first and second fibers.

18. The method of claim 17, comprising moving a fiber coupled to the first fiber to an anchoring unit before moving the control unit to the location of the second fiber.

19. The method of claim 17, wherein moving the control unit to the location of the second fiber comprises using at most two motors.

20. The method of claim 17, wherein determining the first fiber and the second fiber which are to be coupled comprises receiving an instruction over a wireless connection.

21. The switch of claim 1, wherein the movable control unit is adapted to selectively move each of the first optical fibers without moving one or more of the other first fibers with it.

22. The switch of claim 7, wherein the movable control unit comprises a robotic unit mounted on the linearly movable unit, and adapted to move around the linearly moveable unit so as to access any of the second fibers.

* * * * *